(12) United States Patent
Bilchinsky et al.

(10) Patent No.: US 9,078,297 B2
(45) Date of Patent: Jul. 7, 2015

(54) METHODS AND SYSTEMS FOR A MODULAR PROCESSING DEVICE

(75) Inventors: Alexander Bilchinsky, Monosson-Yahud (IL); Ginadi Shaham, Yavne (IL); Eran Ben-Shmuel, Savyon (IL)

(73) Assignee: GOJI LIMITED, Hamilton (BM)

( * ) Notice: Subject to any disclaimer, the term of this patent is extended or adjusted under 35 U.S.C. 154(b) by 499 days.

(21) Appl. No.: 12/918,245

(22) PCT Filed: Feb. 19, 2009

(86) PCT No.: PCT/IL2009/000199
§ 371 (c)(1),
(2), (4) Date: Oct. 8, 2010

(87) PCT Pub. No.: WO2009/104191
PCT Pub. Date: Aug. 27, 2009

(65) Prior Publication Data
US 2011/0031237 A1    Feb. 10, 2011

Related U.S. Application Data

(60) Provisional application No. 61/064,201, filed on Feb. 21, 2008.

(51) Int. Cl.
*H05B 6/68* (2006.01)
*H05B 6/64* (2006.01)
(Continued)

(52) U.S. Cl.
CPC .............. *H05B 6/6426* (2013.01); *G06Q 30/04* (2013.01); *G06Q 30/0641* (2013.01)

(58) Field of Classification Search
CPC ... G06Q 30/04; G06Q 30/0641; H05B 6/6426
USPC ......... 219/679, 678, 700–702, 725, 718, 756, 219/680, 696, 646, 746; 422/21; 426/234, 426/241, 243; 126/21 A, 337 R; 221/150 A
See application file for complete search history.

(56) References Cited

U.S. PATENT DOCUMENTS 2,909,635 A * 10/1959 Haagensen ................... 219/746
4,956,530 A *  9/1990 Koch ........................... 219/701
(Continued)

FOREIGN PATENT DOCUMENTS

WO    WO 2005/041672    5/2005
WO    WO 2007/096877    8/2007
(Continued)

OTHER PUBLICATIONS

International Preliminary Report on Patentability for PCT/IL2009/000199, dated Aug. 12, 2010 (11 pages).
(Continued)

*Primary Examiner* — Quang Van
(74) *Attorney, Agent, or Firm* — Greenblum & Bernstein, P.L.C.

(57) ABSTRACT

A system for heating one or more objects includes a first housing having a power unit configured to generate radio frequency (EM) radiation. One or more second housings include a heating unit having a cavity for positioning the one or more objects. One or more EM radiation conducting elements are configured to conduct the EM radiation from the power unit to the cavity for heating the one or more objects. The first housing and the one or more of the second housings are physically separated from one another.

26 Claims, 9 Drawing Sheets

(51) Int. Cl.
*H05B 6/74* (2006.01)
*G06Q 30/04* (2012.01)
*G06Q 30/06* (2012.01)

(56) References Cited

U.S. PATENT DOCUMENTS

| | | | |
|---|---|---|---|
| 5,020,688 A * | 6/1991 | Power | 221/150 A |
| 6,320,171 B1 | 11/2001 | Kim | |
| 6,686,567 B1 | 2/2004 | Hwang | |
| 7,305,291 B2 * | 12/2007 | Koenig et al. | 701/36 |
| 8,759,726 B2 * | 6/2014 | Ross et al. | 219/646 |
| 2002/0175163 A1 | 11/2002 | Fagrell | |
| 2006/0186115 A1 | 8/2006 | Joines et al. | |
| 2007/0251941 A1 | 11/2007 | Givens | |

FOREIGN PATENT DOCUMENTS

| | | |
|---|---|---|
| WO | WO 2007/096878 | 8/2007 |
| WO | WO 2008/102334 | 8/2008 |
| WO | WO 2008/102360 | 8/2008 |

OTHER PUBLICATIONS

International Search Report for PCT/IL2009/000199, dated Jan. 28, 2010 (5 pages).
Communication Pursuant to Article 94(3) EPC, dated Feb. 6, 2012 in related European Patent Application No. 09712469.7, two pages.

* cited by examiner

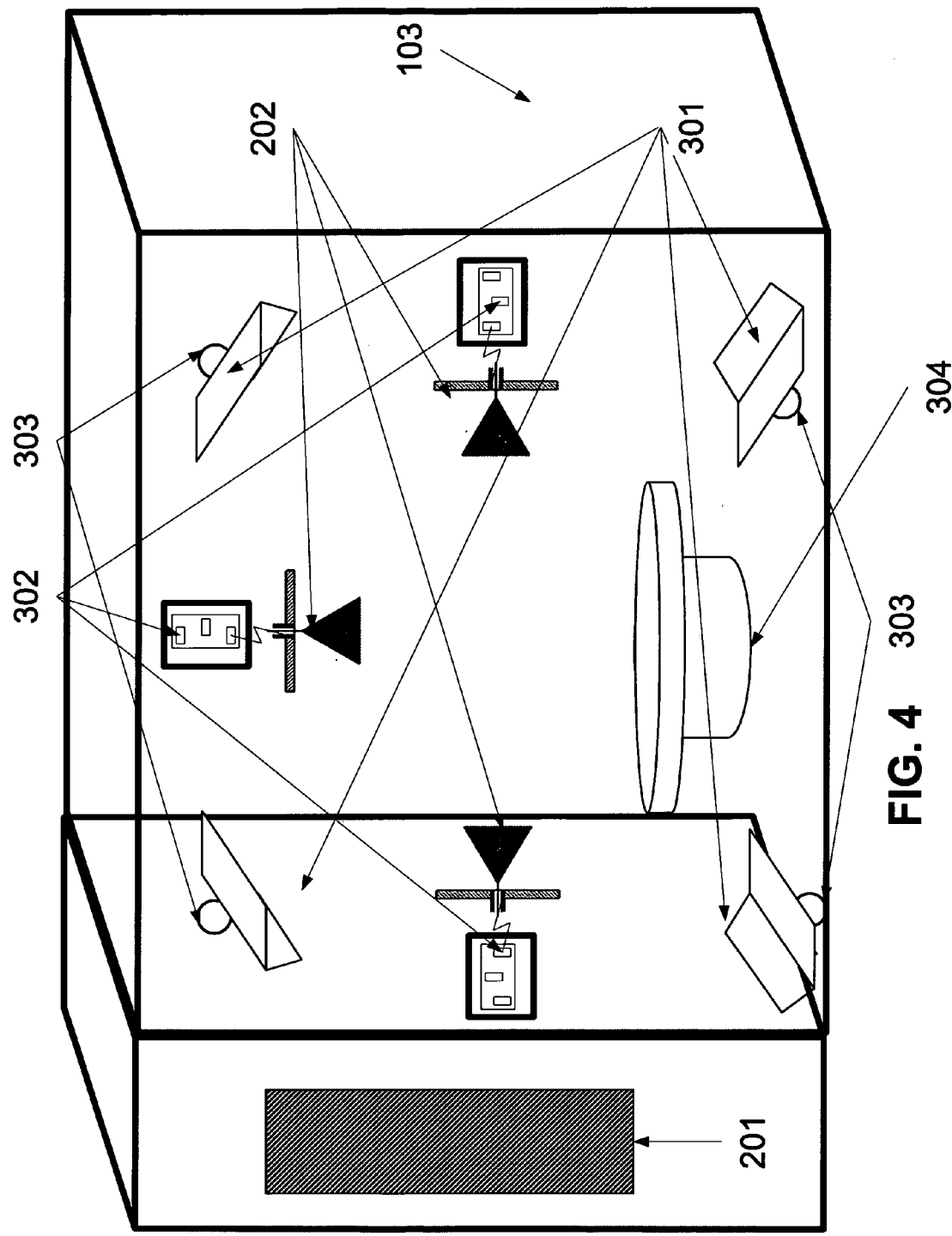

METHODS AND SYSTEMS FOR A MODULAR PROCESSING DEVICE

This application is a national entry under 35 U.S.C. §371 from PCT International Application No. PCT/IL2009/000199, filed Feb. 19, 2009, and claims the benefit under 119(e) of U.S. Provisional Application Ser. No. 61/064,201, filed Feb. 21, 2008, the disclosure of which is expressly incorporated herein by reference.

FIELD AND BACKGROUND OF THE INVENTION

The present invention, in some embodiments thereof, relates to a system and a method for energy depositing devices, such as electromagnetic heaters and, more particularly, but not exclusively, to a system and a method for electromagnetic heaters for cooking different types and/or quantities of products, such as food products.

The microwave heater is a ubiquitous appliance in modern society. A microwave heater, or microwave, comes in many different sizes and styles employing microwave radiation primarily to cook or heat food. This is accomplished by using microwaves, almost always emitted from a magnetron, to excite water, oil, fat and other polarized molecules within the food to be heated. During the last years, microwave heater which is designed for adjusting the heating process according to the heated product has been developed. For example, International Patent Application Pub. No. WO2007/096878 published on Aug. 30, 2007 describes, inter alia, an electromagnetic heater for heating an irregularly shaped object. The electromagnetic heater includes a cavity within which an object is to be placed, at least one feed which feeds UHF or microwave energy into the cavity, and a controller that controls one or more characteristics of the cavity or energy to assure that the UHF or microwave energy is deposited uniformly in the object within ±30% over at least 80% of the volume of the object.

Another example is disclosed in International Patent Application Pub. No. WO08/102,360 published on Aug. 20, 2008, wherein a drying apparatus is disclosed, using radio frequency (RF) energy for drying an object.

Yet another example is disclosed in International Patent Application Pub. No. WO08/102,334 published Aug. 28, 2008 wherein RF energy is used to control the freezing of material.

SUMMARY OF THE INVENTION

According to some embodiments of the present invention there is provided a system for heating one or more objects. The system comprises a first housing comprising a power unit configured for generating radio frequency (EM) radiation, at least one second housing comprising a heating unit having a cavity for positioning at least one object, and at least one EM radiation conducting element configured for conducting the EM radiation from the power unit to the cavity for heating the at least one object. The first housing and at least one of the second housing are physically separated from one another.

Optionally, the power unit is configured to be replaced by a non technical user.

Optionally, the first housing is positioned at a distance of at least 0.3 meters from at least one of the at least one second housing.

Optionally, the first housing and at least one of the second housing are positioned in different spaces.

Optionally, the at least one EM radiation conducting element comprises a plurality of EM radiation conducting elements each configured for conducting a portion of the EM radiation.

More optionally, at least one of the heating units comprises a plurality of feeds each connected to one of the plurality of EM radiation conducting elements and configured for transmitting a respective the portion into the cavity.

Optionally, the system further comprises a plurality of second housings each comprising a heating unit having a cavity for positioning at least one object.

Optionally, the system further comprises a billing module configured for billing a user associated with the heating unit according to the EM radiation.

Optionally, the system further comprises an output module configured for providing use information pertaining to a user associated with the heating unit according to the EM radiation.

Optionally, the system further comprises a user interface for allowing a user to control the power unit from a distance of at least 0.3 meters.

More optionally, the system further comprises the user interface allows a user to purchase a heating credit, the power unit being configured for generating the EM radiation according to the heating credit.

Optionally, the system further comprises a controller configured for controlling the power unit, the controller being configured for managing the EM radiation according to at least one usage credit account.

Optionally, the at least one EM radiation conducting element comprises a coaxial cable.

Optionally, the first housing is configured to be detachably connected to the second housing.

According to some embodiments of the present invention there is provided a facility configured for allowing heating objects in at least one rooms in at least one building. The facility comprises a power unit positioned at a first space of one of the at least one building and configured for generating EM radiation, at least one heating unit at a second space having a cavity for positioning at least one object, and at least one EM radiation conducting element configured for conducting the EM radiation from the power unit to the cavity for heating the at least one object.

Optionally, the first space is selected from a group consisting of a roof, a basement, a cellar, a warehouse, a service area, and a depot, the second space is selected from a group consisting of a living room, a kitchen, and a laundry room.

Optionally, the second space is a serve providing venue.

Optionally, the at least one heating comprising a plurality of heating units; further comprising a controller configured for controlling the power unit according to a plurality of inputs each from a different of a plurality of user interfaces associated with the plurality of heating units.

More optionally, the controller is configured for managing a plurality of credit accounts according to the plurality of inputs.

Optionally, the at least one heating unit comprising a plurality of heating units each located in a different of a plurality of rooms.

According to some embodiments of the present invention there is provided a method for heating at least one object. The method comprises receiving at least one heating instruction from a user interface in a space, generating EM radiation in an additional space, conducting the EM radiation to a cavity with at least one object in the space, and feeding the EM radiation into a cavity for heating the at least one object. The space and the additional space are located at a distance from one another.

Optionally, the distance is at least 0.3 meters.

Optionally, the heating comprises a member of a group consisting of raising a temperature of the at least one object, defrosting of the at least one object, cooking of the at least one object, drying of the at least one object, preventing cooling of the at least one object and preventing freezing of the at least one object.

According to some embodiments of the present invention there is provided a method for heating one or more objects. The method comprises allowing a user to position at least one object in a heating cavity of a first housing and to initiate a heating process, generating EM radiation in a second housing according to the heating process, conducting the EM radiation from the second housing to the first housing, and feeding the EM radiation into the heating cavity for heating the at least one object. The first and second housings are physically separated from one another.

Optionally, the conducting comprises conducting the EM radiation along a distance of at least 0.3 meters.

According to some embodiments of the present invention there is provided a modular electromagnetic heater. The modular comprises a cavity, a power unit comprising an electromagnetic source and a controller associated therewith, and at least one feed for transmitting energy that is generated by the electromagnetic source into the cavity. The at least one of the cavity, the power unit, the electromagnetic source, and the at least one feed is configured to be replaced or added without a calibration in order to operate the device after the replacing or adding.

Optionally, the power unit further comprises a first amplifier, the amplifier being configured to be replaced with a second amplifier or added without a calibration in order to operate the device after the replacing or adding.

Optionally, the first and second amplifiers having a different amplifying power.

According to some embodiments of the present invention there is provided a method for using a modular electromagnetic heater having at least one modular component. The method comprises providing an electromagnetic heater, receiving a heating requirement, adjusting at least one of the at least one modular component according to the heating requirement, and using the modular electromagnetic heater for heating the object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a semi schematic illustration of the modular electromagnetic heater which is depicted in FIG. 1, according to some embodiments of the present invention;

DESCRIPTION OF SPECIFIC EMBODIMENTS OF THE INVENTION

Figure 1:
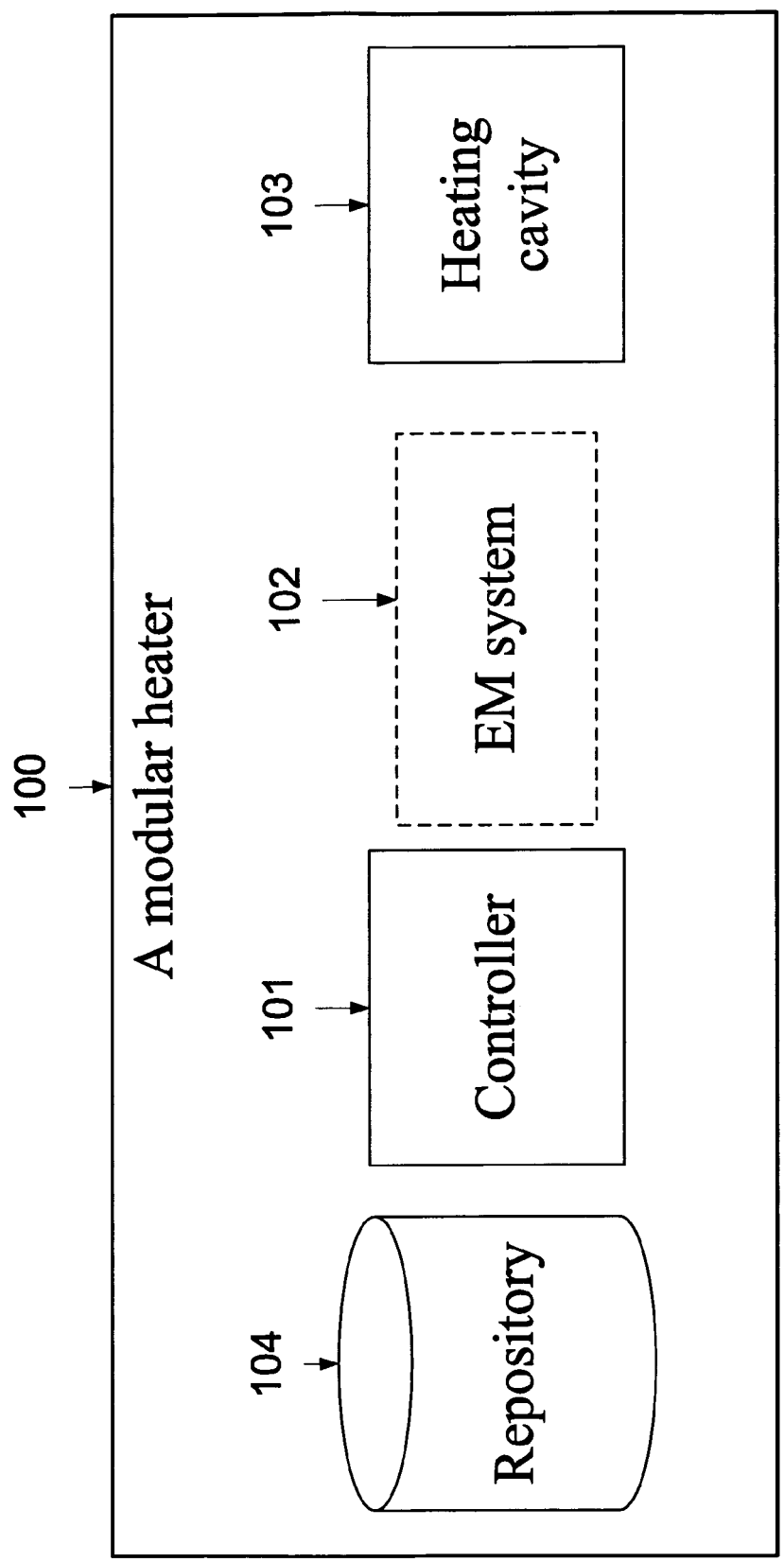
FIG. 1 is a schematic block diagram of a modular electromagnetic heater, according to some embodiments of the present invention.

The present invention, in some embodiments thereof, relates to a system and a method for energy depositing devices, such as electromagnetic heaters and, more particularly, but not exclusively, to a system and a method for electromagnetic heaters for cooking different types and/or quantities of products, for example food products and for a system and a method for electromagnetic heaters for drying materials, such as clothes.

According to an aspect of some embodiments of the present invention a modular electromagnetic heater is provided for electromagnetic (EM) heating, for example an RF heating, of objects for example heating and/or thawing food products, drying clothes, and/or controlling a freezing process). The modular electromagnetic heater having one or more interchangeable components, such as an interchangeable RF source, an interchangeable EM energy feed (e.g. antenna) for feeding energy that is generated by the EM source into the cavity of the modular electromagnetic heater, an interchangeable field adjusting element for improving one or more parameters of the dielectric heating process, and/or any combination thereof. The modular electromagnetic heater may allow one or more of heating, cooking, drying, and/or thawing of one or more objects which are positioned in the resonant cavity.

Such embodiments allow a user to add new functions and abilities to the modular electromagnetic heater, to increase or reduce the time it takes to heat a certain product by changing the power of the modular electromagnetic heater, and the like.

Such a modularity used in an electromagnetic heater which is designed to adjust heating, for example dielectric heating, according to characteristics of the heated objects, for example as described in WO2007/096878, WO08/102,334 WO08/102,360, and/or U.S. Provisional Patent Application No. 61/193,248, filed on Nov. 10, 2008, which are incorporated herein by reference. In such electromagnetic heaters, the speed of the heating process may be influenced, limited or defined by the available power and therefore replacing the EM source thereof with a higher electrical energy may reduce the time it takes to heat a certain product to a certain temperature.

According to some embodiments of the present invention, a system that allows heating one or more objects which are located in a first space and/or housing EM energy that is generated in a second space and/or housing. In use, the EM energy may be generated by a power unit that is located in one room, floor, and/or building, conducted via an EM radiation conducting element, such as coaxial wires and waveguides, to a heating cavity in another room, floor, and/or building, and fed into the heating cavity for heating one or more objects which are located therein. Optionally, the distance between the power unit and the heating cavity is 30 cm, 50 cm, 1 meter, 5 meters, 10 meters, or any intermediate to longer distance.

According to some embodiments of the present invention, a central power unit that provides EM energy to a plurality of heating cavities is provided. The central power unit may be configured for simultaneous and/or sequential heating of objects, which are located in the plurality of heating cavities. Optionally, each heating cavity is associated with a different user interface that allows a different user to initiate, control, and/or configure a heating process for objects which located in the respective heating cavity.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic block diagram of a modular electromagnetic heater 100 for heating, such as a dielectric heating of objects, such as food products and/or apparels, according to some embodiments of the present invention. The heater 100 may function as a dedicated defroster or dryer. The modular electromagnetic heater 100 includes a heating cavity 103 in which one or more objects can be placed, an interchangeable or partly interchangeable radio frequency (EM) system 102 for generating EM radiation, such as non-ionizing microwave radiation, and applying it on the objects which are placed in the heating cavity 103, a controller 101, such as a microcontroller, for controlling the interchangeable or partly interchangeable EM system 102, which may be referred to herein as an interchangeable EM system 102 and a repository for storing a number of heating protocols 104. As used herein, EM radiation means EM radiation, RF radiation, Electromagnetic waves, and Radio waves, for example radio waves centered on a frequency between 300 MHz and 300 GHz, and radio waves centered on a frequency between 700 MHz and 3 GHz. It should be noted that in the figures of the present application, a striped line means interchangeable or partly interchangeable parts and/or systems. Other parts and/or systems may or may not be interchangeable or partly interchangeable. Optionally, Controller 101 is designed to control the EM system 102 during the EM heating, for example as described in one or more of International Patent Applications Pub. No. WO2007/096878, WO08/102,334 and WO08/102,360, which are incorporated herein by reference or in provisional U.S. patent application No. 61/193,248, filed on Nov. 10, 2009. In such an embodiment, the EM system 102 may be designed for emitting EM radiation in various frequencies. In such an embodiment, the EM system 102 analyzes the objects which are placed in the heating cavity 103 and are about to be irradiated. The analysis is optionally based on a spectral image of the objects. After the analysis is completed a heating process which is adjusted according to the analysis is performed. Optionally, the process is dynamic and the energy that is released during the heating process is determined according to repetitive measurements, optionally spectral, which are performed during the dielectric heating process.

For brevity, heating means transmission of electromagnetic energy to a load (object), regardless to whether the transmission induces a temperature change in any portion of the load that is positioned in the heating cavity 103. Heating includes raising a temperature, defrosting, cooking, drying, preventing cooling and/or preventing freezing of one or more objects (loads) or any portion thereof. The one or more objects may comprise food objects, clothes, packaging and/or any combination thereof.

It should be noted that while the various components, which are described in the figures, are shown as separate elements, in a particular implementation, two or more of such components may be packaged as a single modular component.

Optionally, during heating, the temperature of an object is determined, based on the amount of EM power needed for a certain kind of an object and an exact measurement of the EM power absorbed in the object, through the knowledge of the efficiency of power transfer and the power into the feeds of the heating cavity 103, for example as described in International Patent Application Pub. No. WO2007/096878 published on Aug. 30, 2007, which is incorporated herein by reference. Optionally, the heating cavity 103 is used as a resonator.

As described above, the modular electromagnetic heater 100 has an interchangeable EM system 102. As used herein, interchangeable system and/or part means a system and/or part that is designed for user attachment and/or replacement. As used herein, a user means a non-technical user without significant technical understanding in electromagnetic heaters assembly and/or disassembly. Optionally, interchangeable system and/or part means systems and/or parts that may be releasably attached by a user in a short time, such as in less than 15 minutes, for example 30, 45, 60, 120, 180, 240, and 300 seconds, optionally without special tools. Optionally, interchangeable system and/or part means releasably attached components such as unwelded and/or unscrewed components. Optionally, interchangeable system and/or part means systems and/or parts which are connected to the housing of the modular electromagnetic heater 100 via coupling components, such as connectors, sockets and the like. Optionally, interchangeable system and/or part means components that may be replaced in a limited time with a respective system and/or part without having to also disassemble parts which are essential for the correct functioning of the modular electromagnetic heater 100. Optionally, the interchangeable systems and/or parts are designed to fit in a housing, replaced and/or added without electric hazards, and/or to trigger the automatic cut off of the modular electromagnetic heater 100 when replaced and/or disconnected. Optionally the interchangeable system and/or part means components that a sensor is configured to detect the replacement and/or addition thereof.

Optionally, components of the EM system 102 are interchangeable and/or addable. For example the EM system 102 is designed to use amplifiers with different amplifying power. In such an embodiment, the used amplifier may be replaced and/or an additional amplifier may be added thereto without calibrating the EM system's controller and/or any other unit. To that end, controller 101 may be configured to identify the power produced by the one or more power units connected to the cavity and to select different control parameters to accommodate the change between one power level and another.

Figure 2:
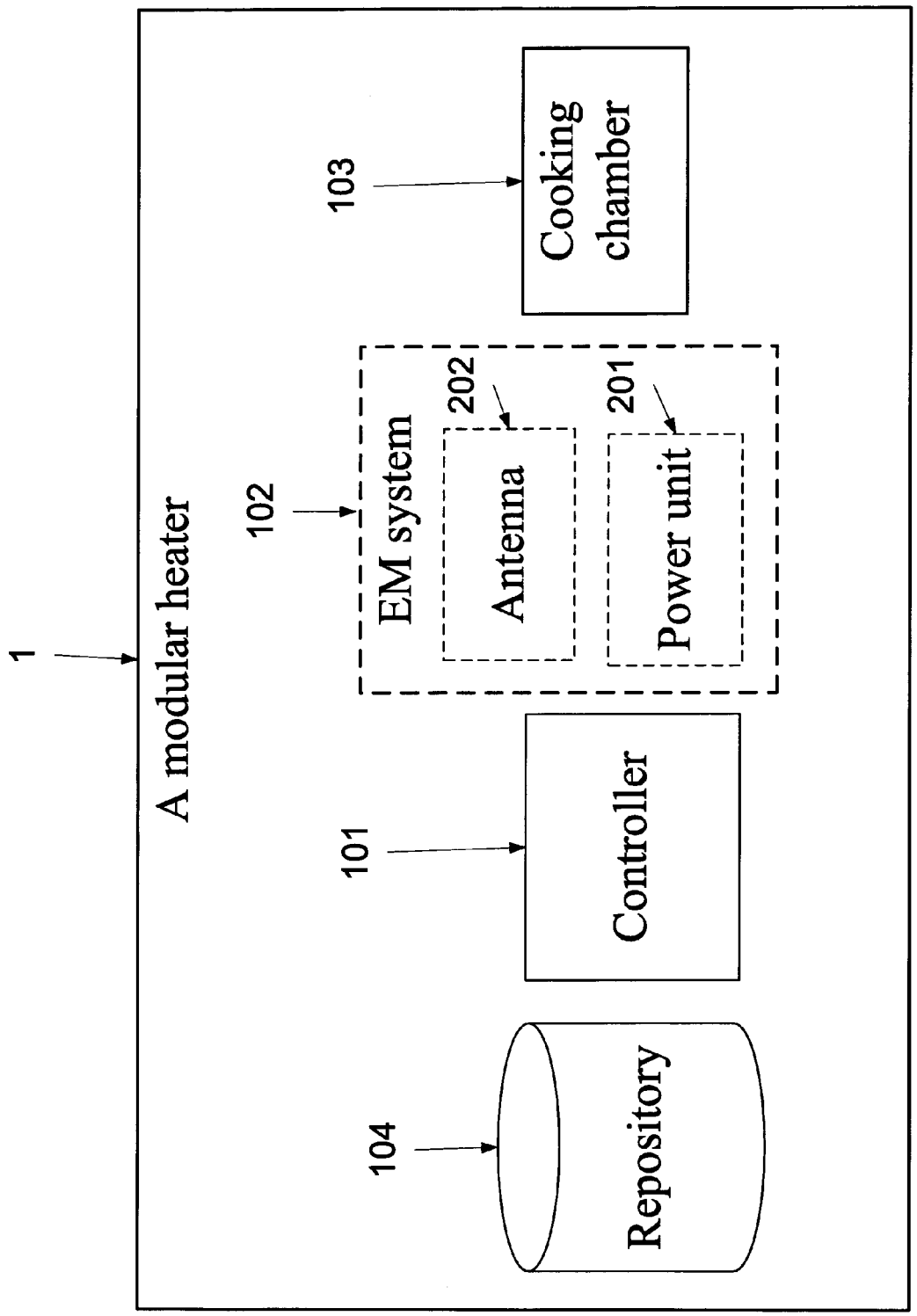
FIG. 2 is a schematic block diagram of the modular electromagnetic heater of FIG. 1, wherein the EM system and/or the EM reflectors are modular, according to some embodiments of the present invention.

Reference in now made to FIG. 2, which is a schematic block diagram of the modular electromagnetic heater of FIG. 1, wherein the interchangeable EM system 102 and/or the heating cavity 103 are modular and have interchangeable or partly interchangeable parts, according to some embodiments of the present invention.

The EM system 102 optionally comprises a high voltage transformer, which passes energy to an EM source, such as a magnetron or any other means capable of producing EM energy, an EM source control circuit, such as a microcontroller, optionally one or more waveguides, and one or more feeds (e.g. antennas) for coupling energy that is generated by the magnetron into the heating cavity 103.

Optionally, the EM source and optionally the EM source control circuit are packed as a unit, optionally interchangeable, which may be referred to herein as a power unit 201. Optionally, the power unit 201 comprises one or more microwave oscillators that function as a frequency source. The output of the oscillators is fed, optionally directly, into one or more solid state amplifiers that boost the microwave power level from the milliwatt range to the watt range. The output of the amplifier is then fed into a microwave applicator, for example via one or more antennas which power a heating process in the heating cavity 103. Optionally, multiple solid state amplifiers operating in parallel are used to increase the final power level. The output of all of these amplifiers is then fed into a power combiner that matches the outputs of all of the amplifiers into a single transmission line. Using this technique several kilowatts of microwave power can be produced. It is recognized that there are many different methods which will allow the boosting of the final output power levels. It is the intent of some embodiments of the present invention to realize the resultant increased power output in controlled processing which these solid state amplifiers provide.

In such an embodiment, the power unit 201 may be replaced according to the requirements of the user. For example, the user may purchase the modular electromagnetic heater 100 with a power unit with 1 kilowatt (kW) and later upgrade it by replacing the power unit 201 with a new power unit of 2 kW, for example by adding a 1 kW power unit or by replacing the 1 kW power unit with the 2 kW power unit. Optionally, the electromagnetic heater 100 includes a socket that is designed to interface between the interchangeable power unit 201 and the controller. In use, the user positions the interchangeable power unit 201 in the socket, allowing the controller 101 to activate and/or deactivate the EM source and optionally to adjust the power thereof. Optionally, the socket and/or the controller identify one or more of the properties of the power unit 201, for example the load and/or the frequency thereof. Optionally, the controller selects one of the heating protocols which are stored in the repository 104 according to the identified properties and/or power unit 201. Examples for some optional heating protocols are included in one or more of WO2007/096878, WO08/102,334, WO08/102,360 and provisional U.S. patent application No. 61/193,248, filed on Nov. 10, 2009. In such an embodiment, the user may rent a power unit 201 for adjusting his modular electromagnetic heater 100 for a certain occasion, for example, if he is going to host a party and has to heat massive amount of food products to increase power of the modular electromagnetic heater 100 or, in case of a professional kitchen (e.g. restaurant) a power unit 201 may be bought or rented in order to increase the output rate from the kitchen. In such a manner the heating process may take less time.

Optionally, the modular electromagnetic heater 100 or any one of the interchangeable system and/or part is associated with a counter, such as a memory code for limiting and/or recording usage. For example, the counter may used for limiting, optionally by a controller tracking use, of one or more of the usage time, the energy used, the number of uses, type of cooking process, weight of the processed one or more objects, volume of the processed one or more objects, and/or a combination thereof. In some embodiments, the counter is provided, via a network, by a remote server or a cellular phone, to a device such as an oven, whose operation is to be controlled. Optionally, the counter is provided together with operational software and/or script that may be provided in a similar manner.

Figure 3:
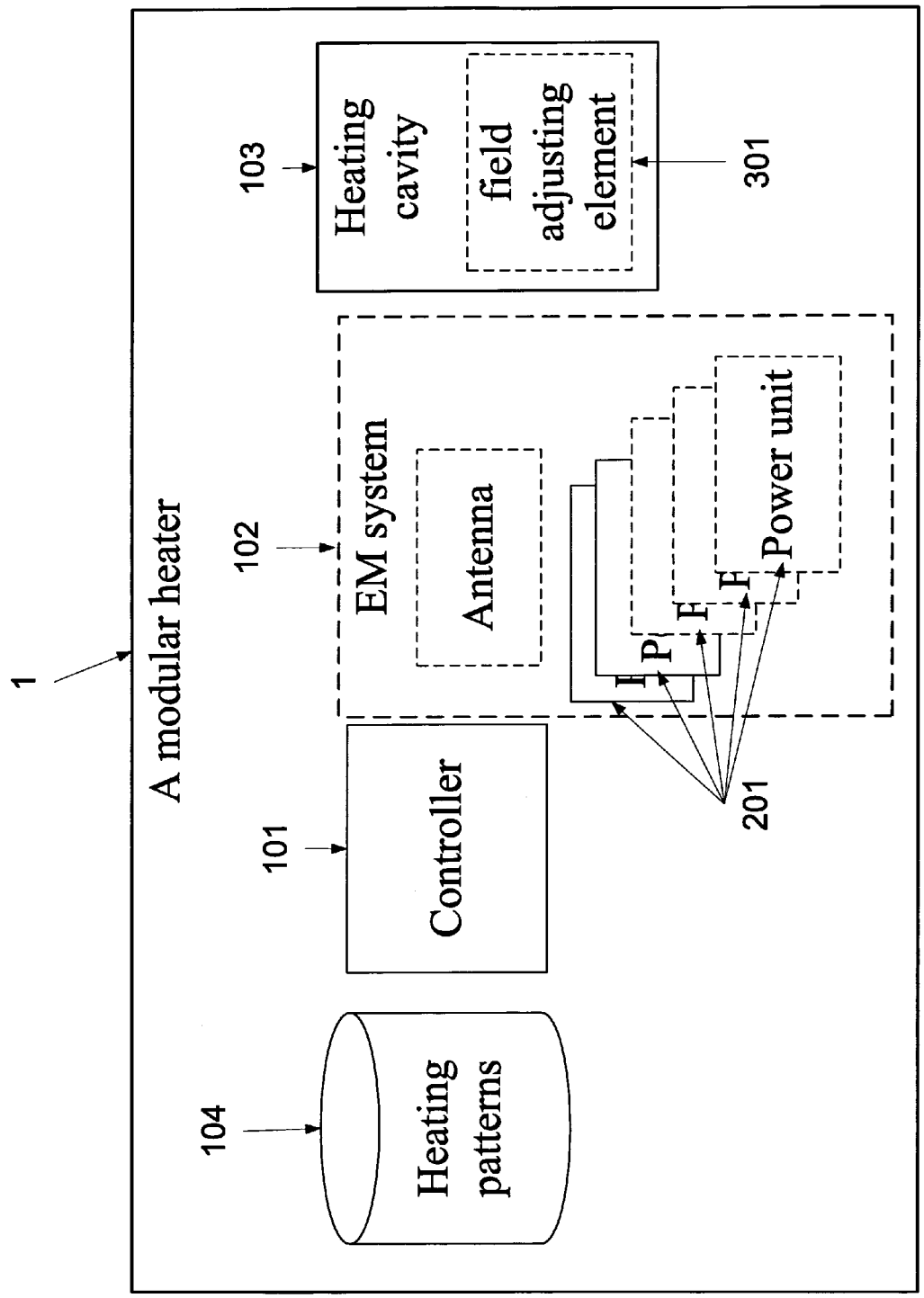
FIG. 3 is a schematic block diagram of a modular electromagnetic heater that comprises a plurality of power units, according to some embodiments of the present invention.
Figure 5C:
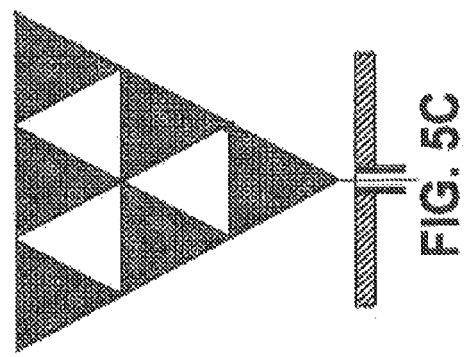
FIGS. 5A-D are schematic illustrations of exemplary interchangeable antennas, according to some embodiments of the present invention.
Figure 5D:
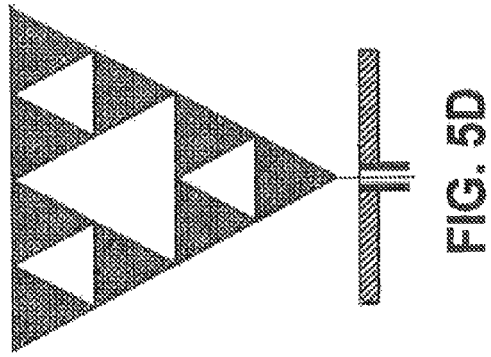
Figure 5A:
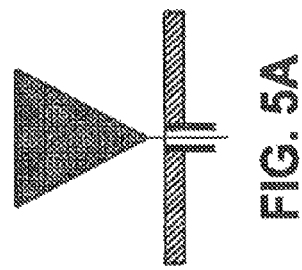
Figure 5B:
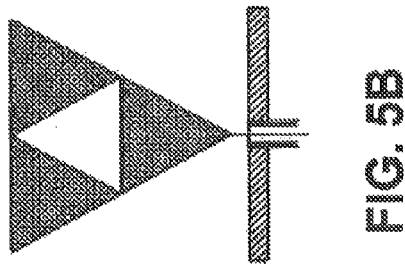

Optionally, the modular electromagnetic heater 100 is designed to use a number of power units 201. In such an embodiment, for example as depicted in FIG. 3, the controller 101 may switch between the power units 201 which are connected thereto. Optionally, the controller 101 is designed to activate one or more of the power units 201 simultaneously. In such an embodiment, the power from two or more packs may be combined using a combiner, for example DEV 2644 or DEV 2644/75 broad band divider/combiner of DEV Systemtechnik GmbH & Co. KG, Germany, which the specifications thereof are incorporated herein by reference. Optionally, a directional coupler is used after the power combiner. The controller 101 recognizes the power that is generated by the combiner and utilizes it for the dielectric heating process. In such an embodiment, the user may add power units 201 in order to increase the power of the modular electromagnetic heater 100, thereby allowing the reduction of the time needed for the heating process. Optionally, as depicted in FIG. 3, one or more of the power units may be fixed while other(s) may be interchangeable.

Reference is now made to FIG. 4, which is a schematic illustration of the modular electromagnetic heater 100 which is depicted in FIG. 2, according to some embodiments of the present invention. FIG. 4 schematically depicts an interchangeable power unit 201, antennas 202 (also referred to herein as feeds), a load plate 304, and a heating cavity which are described above. However, FIG. 4 further depicts a set of field adjusting elements 301, a set field adjusting element connectors 303, and a set of antenna connectors 302.

In some embodiment of the present invention, the one or more antennas 302 or part of the one or more antennas 302 are interchangeable antennas. Optionally, the set of antenna connectors 302 allows the user to detachably connect different antennas, for example as depicted in FIGS. 5A-5D to the modular electromagnetic heater 100. Optionally, the user may connect antennas with a radiating element chosen from the group consisting of a patch antenna, a fractal antenna, a helix antenna, a log-periodic antenna, a spiral antenna and a wire formed into a partial loop. More information about the antennas is provided in International Patent Application Pub. No. WO2007/096878 published on Aug. 30, 2007, which is incorporated herein by reference. Optionally, one or more of the set of antenna connectors 302 includes a sensor and/or a socket which is connected to the controller 101 and allows the identification the antenna type. Optionally, the controller changes and/or adjusts the heating protocol according to the type of the antenna which is attached to the connector.

Optionally, the number of antennas is determined according to the number of power units 201 and/or the energy which is produced by the one/or more power units 201 which are connected to the modular electromagnetic heater 100. Optionally, each one of the power units 201 is directly connected to one or more of the antennas 202 or to one or more segments thereof. In such an embodiment, the power is combined on the object which is processed and not in a power combiner or the like. Furthermore, the antennas 20 or segments thereof may be operated separately, with the power which is taken from each power unit 201 separately, and combined on the object. Alternatively, the input of power may be synchronized, for example in order to benefit from the advantage of using antenna arrays, for example as described in International Patent Applications Pub. Nos. WO2007/096878, WO08/102,334 and WO08/102,360, which are incorporated herein by reference. In such an embodiment, a conventional divider may be used before the waves are forwarded to the antenna. Optionally, a plurality of directional couplers are needed, one for each power pack and the controller will need to be configured to combine the results.

In some embodiment of the present invention, the heating cavity 103 is attached with field adjusting elements connectors, at shown at 302. In such a manner, the user may replace the field adjusting elements 301 which are connected to the heating cavity 103 and used for improving one or more parameters of the dielectric heating process, for example as described in International Patent Application Pub. No. WO2007/096878 published on Aug. 30, 2007, which is incorporated herein by reference. In an exemplary embodiment of the invention, at least one of the field adjusting elements may be moved and/or rotated and/or folded/unfolded to improve one or more parameters of the heating process. Optionally, the moving, rotation and/or folding of the field adjusting element are controlled by the controller 101. Optionally, one or more of the set of field adjusting element connectors 303 includes a sensor and/or a socket which is connected to the controller 101 and allows the identification the type of the field adjusting element connector that is connected thereto. Optionally, the controller 101 changes the moving, rotation and/or folding according to the identification of the field adjusting element.

Figure 6:
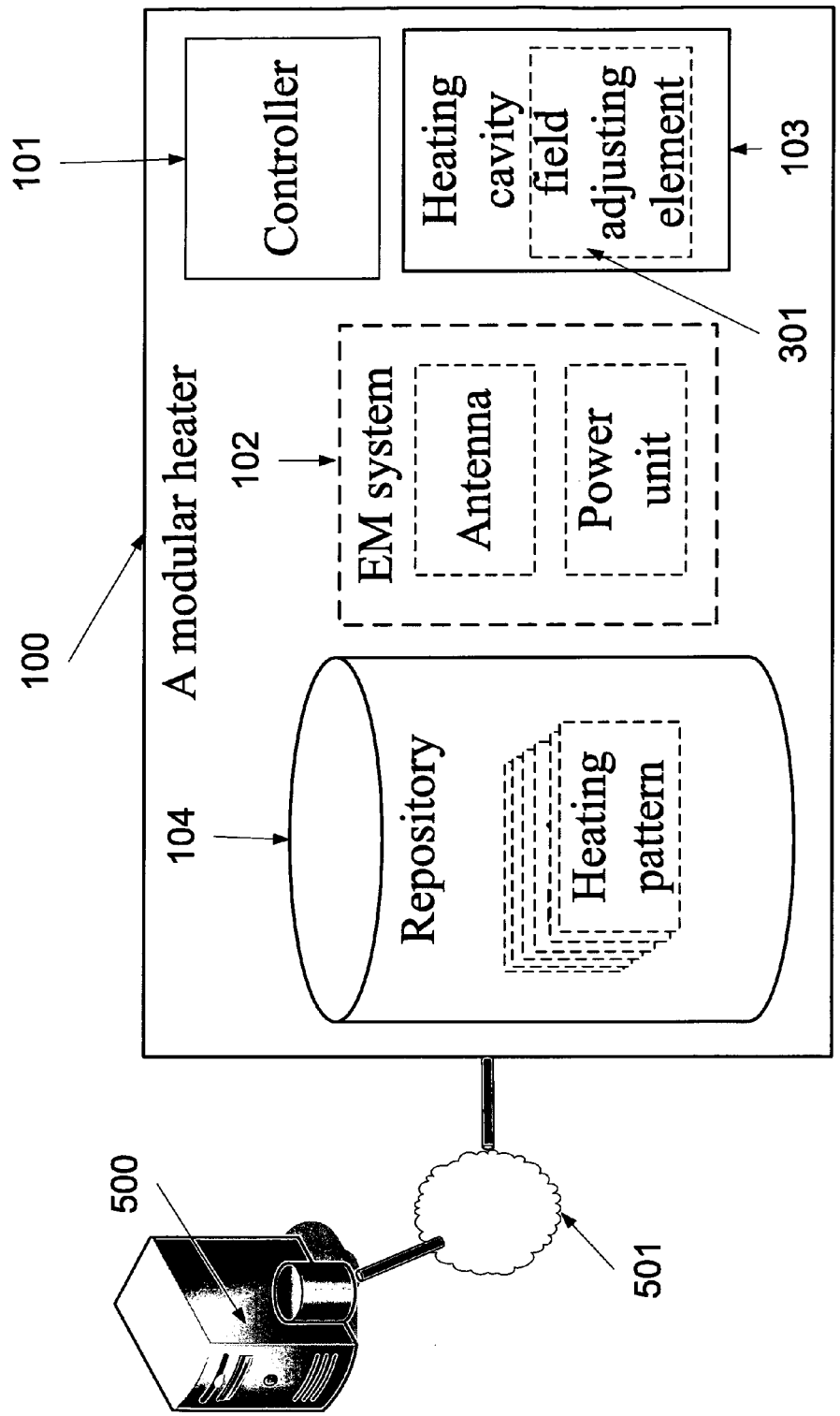
FIG. 6 is a schematic block diagram of a modular electromagnetic heater that is connected to a computer network and comprises a heating protocol database that comprises a plurality of heating protocols, according to some embodiments of the present invention.

Reference is now made to FIG. 6, which is a schematic block diagram of the modular electromagnetic heater of FIG. 1, wherein the repository hosts a plurality of heating protocols 401 and the modular electromagnetic heater 100 is connected to a remote server 500 via a computer network 501, such as the interne, according to some embodiments of the present invention. Optionally, each one of the plurality of heating protocols 401 is adjusted according to one or more interchangeable components of the modular electromagnetic heater 100, such as the interchangeable antenna 202, the interchangeable power unit 201, the interchangeable field adjusting element 301, and/or any combination thereof. Optionally, the repository is designed to be updated with new heating protocols. Optionally, the modular electromagnetic heater 100 includes a socket, such as a USB connection or a flash memory card connection that allows the uploading of new heating protocols to the repository 104. Optionally, the modular electromagnetic heater 100 comprises a connection to a computer network, such as a wireless and/or wired connection. The connection allows the controller 101 to communicate with a remote server, optionally as shown at 500 that host a number of different heating protocols. Optionally, the modular electromagnetic heater 100 uses the connection to download new heating protocols when a new interchangeable component, such as the interchangeable antenna 202, the interchangeable power unit 201, the interchangeable field adjusting element 301, is connected thereto. Optionally, the remote server adjusts one or more of the heating protocols when needed.

In some embodiment of the present invention, the interchangeable parts of the modular electromagnetic heater 100 are provided separately. In such a manner, a recipient, such as a buyer, may select the components he wants, optionally according to a predefined specification, for example in a store, a website, and/or any from any retailer and the provider may provide him with the required modular electromagnetic heater 100 and required interchangeable parts, for example on the spot. Optionally, the interchangeable parts are added by a supplier according to a specification that is received from a customer. In such an embodiment, the supplier may provide the modular electromagnetic heater 100 and the interchangeable parts in a relatively short period, without having to weld and/or to assemble the parts.

Figure 7:
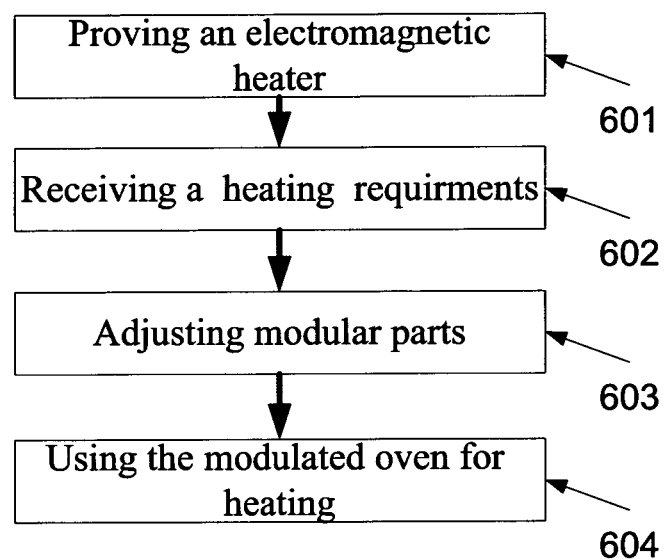
FIG. 7 is a flowchart of a method for using a modular heater for heating, according to some embodiments of the present invention.

Reference is now made to FIG. 7, which is a flowchart of an exemplary method for using a modular electromagnetic heater having at least one modular component. The method comprises providing an electromagnetic heater 601, optionally as described above, receiving a heating requirement related to an object 602, optionally according to an analysis, such as a spectral analysis, as described above, adjusting one or more of the modular components according to the heating requirement 603 and using the modular electromagnetic heater for heating the object 604.

Figure 8:
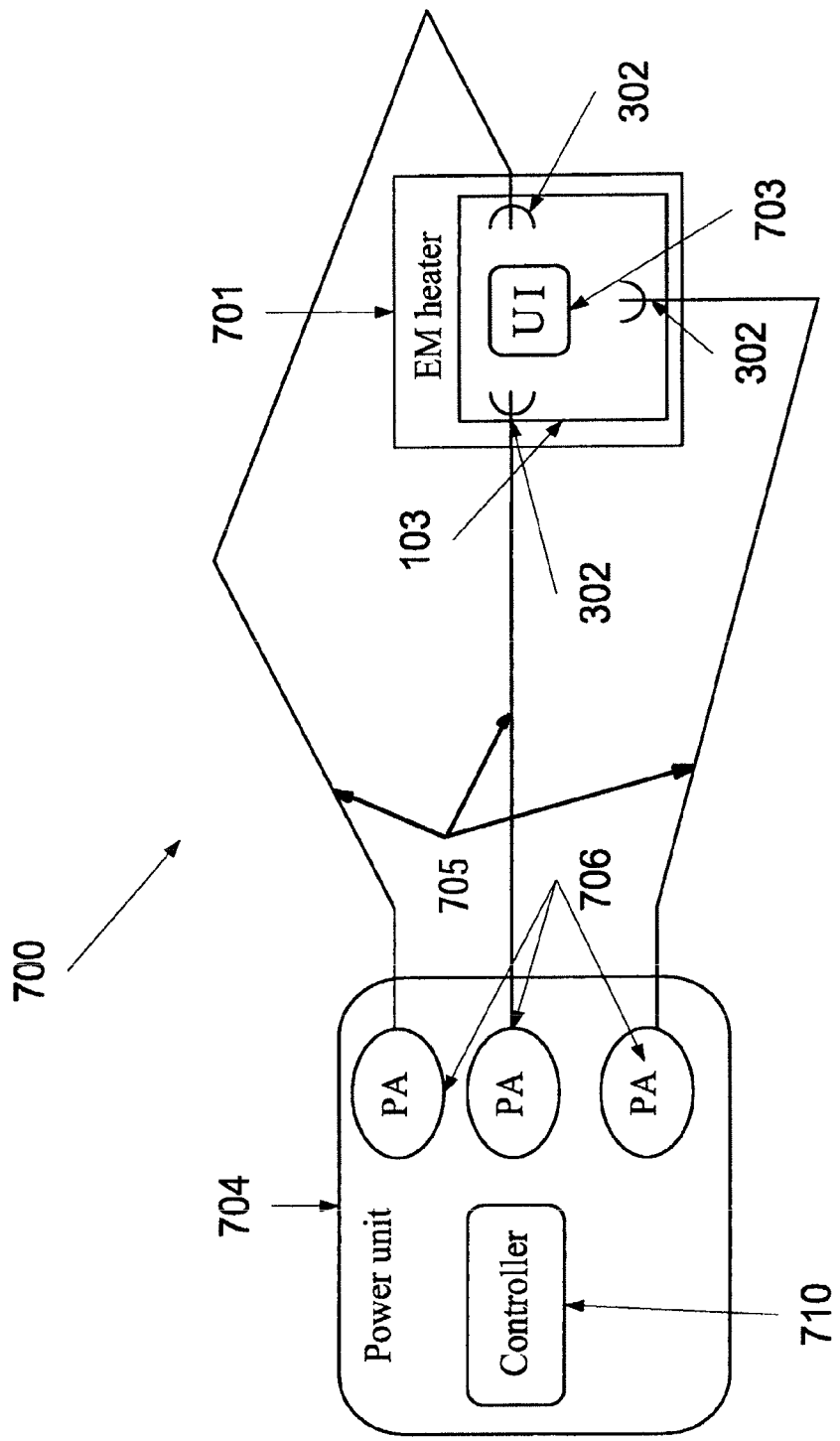
FIG. 8 is a schematic illustration of a system having an electromagnetic heater and a separate power unit according to some embodiments of the present invention.

Reference is now made to FIG. 8, which is a schematic illustration of a distributed system 700 for heating an object, according to some embodiments of the present invention. The distributed system 700 comprises a heating unit 701 that includes a heating cavity, such as the heating cavity 103 that is described above and a user interface (UI) 703 for allowing the user to control the heating of objects in the heating cavity 103. The distributed system 700 further comprises a power unit 704, optionally interchangeable, for example in a similar manner to the interchangeable power unit 201. An EM radiation conducting element 705, (for example one or more coaxial wires and waveguides), connects between the heating unit 701 and the power unit 704. Optionally, the EM radiation conducting elements are capable of transmitting EM radiation in the range between 500 MHz and 1.2 GHz, for example between 700 MHz and 1000 MHz, with 3 dB attenuation or less between the power unit and the EM heater. It is appreciated that using cables of lower attenuation and reducing the cable distance would reduce the overall attenuation. Using commercially available cables it is possible to construct an EM radiation conducting element of the lengths disclosed above with an attenuation of 2 dB, 1 dB, 0.3 dB, 0.15 dB, and/or any intermediate or less attenuation between the power unit and the EM heater.

For example, the EM radiation conducting element 705 may be LMR™ 1700 coaxial cable of Times Microwave Systems (TMS), which the specification thereof is incorporated herein by reference. In such a manner, the heating unit (also referred to herein as a processing unit) 701 and the power unit 704 may be positioned in different spaces (first housings 701a, 701b and second housing 704a, respectively), for example separated by a wall, in different rooms, on different floors, and/or in different storage/service units. Optionally, the heating unit 701 and the power unit 704 are housed in separate housings which are optionally positioned in different rooms, floors, and/or spaces. For example, the heating unit 701 may be located in a service environment in which clients are served, such as the front of fast food diner or a dining room of a restaurant and the power unit 704 is positioned in a back room of the diner or the restaurant. In such an embodiment, a client or a service provider may use the heating unit 701 to warm food objects without increasing the noise level and/or the escaped radiation level at the front the diner or at the dining room of the restaurant.

Optionally, the distance between the heating unit 701 and the power unit 704 is more than 0.3 meter, 0.5 meter, 1 meter, 5 meters, 10 meters, 15 meters, 50 meters, 100 meters, and/or any intermediate or larger value. Similarly to the described above, the power unit 704 comprises a high voltage transformer that passes energy to an EM source, such as a magnetron or any other means capable of producing EM energy. Such an EM energy production may generate vibrations in the air, considered as herein as noise. Additionally, at times a cooling system may be used to cool the power unit and prevent overheating of one or more components thereof. It should be noted that as such cooling system may produce noise, positioning the power unit in a separate and/or a remote space, as described below, allows operating a heater without increasing the noise in its surrounding during the operation thereof. The position of the power unit 704 at a distance from the heating unit 701 allows the user to heat the objects which are positioned in the heating cavity 103, for example apparels and/or food objects, at a certain space while the noise is produced in another space, such as a different room, floor, and/or storage unit. In addition, EM radiation may escape from the power unit 704 during the EM production process. The position of the power unit 704 in a distance from the heating unit 701 may also allow the user to heat the objects which are positioned in the heating cavity 103 in a certain space while escaped EM radiation that is emitted by the power unit 704 and not reaching the heating unit 701 is in another space, such as a different room, floor, and/or storage unit. Additionally or alternatively, a separation between the power unit 701 and the heating unit 704 allows saving space at the heating site as a portion of the device is positioned elsewhere.

In use, a user may position one or more objects in heating cavity 103 and use UI 703 for defining and/or initiating the heating process. The instructions from UI 703 are forwarded to power unit 704 via a communication connection, such as a wired or a wireless connection. Optionally, sensors in the heating cavity 103 may forward data pertaining to the heating process to power unit 704, for example via a local controller at the heater 701 and/or a controller 710 at the power unit 704. In such a manner, dynamic heating patterns which are based on the reaction of heated objects to the EM radiation, for example the absorption of the EM radiation may be implemented by the power unit. Examples for such dynamic heating patterns are provided in International Patent Applications No. PCT/IL2007/000864, PCT/IL2007/000235, and PCT/IL2007/000236. International Patent Application Pub. No. WO08/102,360, and U.S. Provisional Patent Application No. 61/193,248, filed on Nov. 10, 2008 which are incorporated herein by reference. Optionally, power unit 704 is configured for forwarding status information to heating unit 701, for example to UI 703. The status information may include technical information, such as temperature indication, humidity, indication, and/or any other indication about power unit 704.

Optionally, heating unit 701 and power unit 704 are detachably connected to one another. In such an embodiment, the user may replace or supplement the power unit 704 which is connected to the heating unit 701 with another power unit, having a different amplifying power. Optionally, heating unit 701 comprises a designated chamber and/or connector for detachably attach the power unit 704.

Optionally, heating unit 701 and power unit 704 comprise communication units for allowing such a communication. Optionally, the communication units may comprise a short-range radio interface, such as a Bluetooth™ transceiver, which is defined according to IEEE 802.15.1 specification that is incorporated herein by reference, optionally utilizing a Bluetooth™ enhanced data rate (EDR) chip that is defined according to Bluetooth™ core specification version 2.0+EDR of the Bluetooth™ special interest group (SIG), which is incorporated herein by reference, or a Wibree® transceiver. Optionally, the communication unit comprises a radio transceiver that uses ultra-wideband (UWB) frequencies. In such an embodiment, the wireless interface may establish a wireless personal area network (WPAN) according to WiMedia™ specification or according to the Wireless USB (WUSB), which are incorporated herein by reference. Optionally, the communication unit supports a serial port profile (SPP) connections between the heating unit 701 and the power unit 704. Optionally, the communication unit comprises a wireless local area network (WLAN) interface such as a radio transceiver that uses high frequency radio signals, which are defined according to a WLAN standard, for example 802.11a, 802.11b, 802.11g, and 802.11n standards, which are herein incorporated by reference. The WLAN interface optionally uses high frequency radio signals. In such an embodiment, the WLAN interface is defined according to WiMAX™ IEEE 802.16 standard or wireless FireWire IEEE 802.15.3 standard, which are incorporated herein by reference.

As depicted in FIG. 4 and in FIG. 8, heating unit 701 comprises one or more antennas 302 for emitting EM radiation in heating cavity 103. Optionally, each antenna 302 is separately connected to a power amplifier (PA) 706, for example a solid state amplifier which is positioned in power unit 704. Optionally, power unit 704 comprises a plurality of PA 706, each separately connected to a different antenna 302, for example as shown at FIG. 8. Optionally, a single amplifier is connected, optionally separately, to the plurality of antennas 302. In such an embodiment, an EM switch assembly may be used, for example an EM switch assembly having 70 dB at DC-4 Ghz minimum isolation, EM input power of 500 Watts at 500-2000 MHz, switching speed of 20 milliseconds after command is processed, and an Ethernet(10/100)/RS-232/Manual control of JFW industries, which the specification thereof is incorporated herein by reference.

Figure 9:
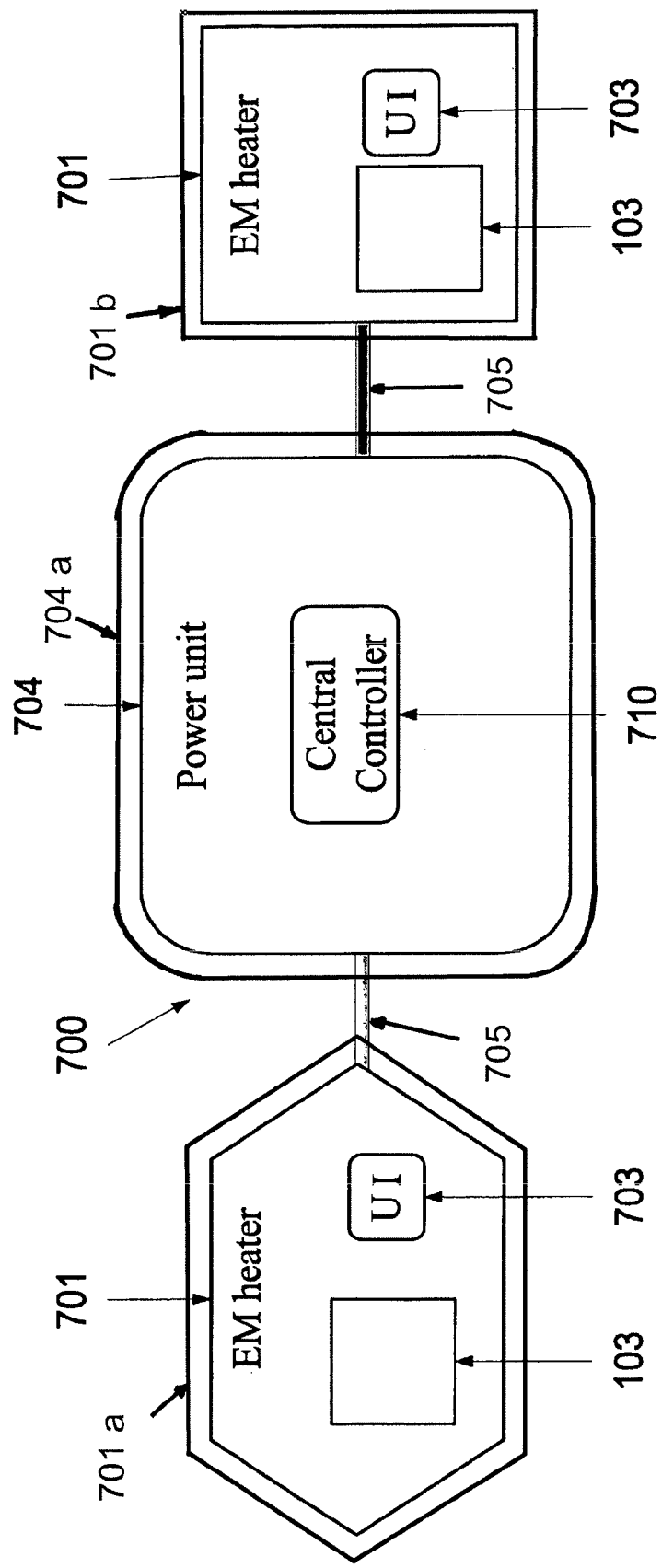
FIG. 9 is a schematic illustration of a system having a plurality of electromagnetic heaters and a central power unit, according to some embodiments of the present invention.

Reference is now made to FIG. 9, which is a schematic illustration of the distributed system 700 in a configuration that allows connecting a plurality of heating units 701 to power unit 704, according to some embodiments of the present invention. In such an embodiment, EM radiation that is generated by the power unit 704 may be forwarded to any of the plurality of remote heating units 701. In use, the plurality of heating units 701 may be operated simultaneously or sequentially. The plurality of heating units 701 may be located in a proximity to one another, for example in the same room, or away from one another, for example in different rooms and/or floors. The ability to use a plurality of heating units 701 with a single power unit 704 allows using and maintaining a single power unit without reducing the number of heating units 701 that may be operated simultaneously or sequentially by a certain facility, such as a restaurant, a EM radiation supplier, and/or a laundry cleaner or others. The ability to distribute the heating units 701 in different spaces, such as different rooms, allows operating various heating units in different spaces, for example private cooking ovens and/or other heaters may be placed in different floors/rooms of a motel or an apartment building for usage by residents, as well as cooking ovens and/or laundry driers for a usage of the motel's restaurant and/or catering and/or washing services which are located in one or more service areas of the hotel or building. Such an embodiment allows a plurality of users to jointly use and maintain a single power unit, while each has its own one or more heating units.

Optionally, power unit 704 is located in a sound, a radiation and/or a heat absorbing housing and/or space.

In some embodiments of the present invention, power unit 704 is connected to a central controller 710 that is configured for managing the transmission of EM radiation to the heating units 701. In such an embodiment, central controller 710 may allocate the generated EM radiation to heating units 701 according to requests from respective UIs 703, an allocation pattern, and/or instructions which are received for a system operator. Optionally, central controller 710 allocates the generated EM radiation according to credit accounts which are allocated to various EM radiation accounts. In such a manner, system 700 allows operating distributed heating units 701 according to the credit that is allocated to different users. Optionally, the system allows allocating EM radiation in a pay per use payment model. In such an embodiment, the user may purchase a usage credit in advance and/or use the UI 703 for purchasing heating sessions on the spot. Central controller 710 instructs the forwarding of the EM radiation accordingly. For example, a user may use heating units 701 for heating objects, such as food objects and apparels, and the central controller 710 may debit her account according to the amount of EM radiation which is allocated for the heating process. Optionally, central controller 710 manages a list of blocked from usage users and/or a list of users that allow using the power unit 704.

Optionally, central controller 710 allocates EM radiation according to the priority of the heating units 701. In such an embodiment, each heating unit 701 may be associated with a dynamic or static ranking. A static ranking may be documented in a list that is accessed by the central controller 710 for prioritizing the EM radiation allocation to the heating units 701. A dynamic ranking may be determined according to dynamic variables, such as the time of the day, usage history, users' credit, user's identity, and the like.

Optionally, central controller 710 is connected to a plurality of power units 704, each configured for allocating EM radiation in different power levels. In such an embodiment, central controller 710 may select a power unit according to the power level which is needed to be allocated to a certain user. Optionally, the number of power units 704 which are connected simultaneously is determined according to the cumulative need for EM radiation.

Optionally, central controller 710 manages a reservation queue for one or more users and allocates the EM radiation according to the reservation queue. In such an embodiment, the users may use the UI 703 of their heating unit 701 for submitting a request for an EM radiation in a certain hour, day, week, and/or month. For example, a user may request a certain amount of EM radiation and/or a number of heating sessions for heating objects and or drying apparels in a certain day and/or an hour.

As described above, while the description above is focused on EM heaters, it should be appreciated that within the scope of some embodiments of the invention, is the application of the above method and or apparatus for other appliances such as food processing devices, such as ovens and/or dryers.

The teachings of International Patent Applications No. PCT/IL2007/000864, PCT/IL2007/000235, and PCT/IL2007/000236 and International Patent Application Pub. No. WO08/102,360, which are incorporated herein by reference.

The teachings of U.S. Provisional Patent Application No. 60/924,555 filed May 21, 2007, 60/806,860 filed Jul. 10, 2006, U.S. Provisional Patent Application 60/775,231 filed Feb. 21, 2006, U.S. Provisional Patent Application 60/935,788, filed Aug. 30, 2007 U.S. Provisional Patent Application No. 60/935,787 filed Aug. 30, 2007, U.S. Provisional Patent Application No. 61/193,248, filed on Nov. 10, 2008, and U.S. Provisional Application No. 61/193,248, filed on Nov. 10, 2008 are also incorporated herein by reference.

It is expected that during the life of a patent maturing from this application many relevant apparatuses and methods will be developed and the scope of the term EM source, waveguide, and antenna are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A system for processing a plurality of objects, comprising:
    a first housing comprising a power unit configured for generating electromagnetic radiation;
    a plurality of second housings each comprising a processing unit having a resonant cavity for positioning at least one of said plurality of objects; and
    a plurality of electromagnetic radiation conducting elements each configured to conduct, simultaneously with others of said plurality of electromagnetic radiation conducting elements, a portion of said electromagnetic radiation generated by said power unit to respective resonant cavities of said plurality of second housings for processing said plurality of objects;
    wherein said first housing and said plurality of second housings are separate from one another.

2. The system of claim 1, further comprising at least one coupling component connected to said power unit so as to allow replacing said power unit without disassembling other parts involved in operation of said system.

3. The system of claim 1, wherein said first housing is configured to be positioned at a distance of at least 5 meters from at least one of said plurality of second housings.

4. The system of claim 1, wherein said first housing and at least one of said plurality of second housings are configured to be positioned in different rooms.

5. The system of claim 1, wherein at least one of said processing units comprises a plurality of feeds each connected to one of said plurality of electromagnetic radiation conducting elements and is configured for transmitting said electromagnetic radiation into said processing unit's associated resonant cavity.

6. The system of claim 1, wherein a user account is debited based on an amount of electromagnetic radiation generated.

7. The system of claim 1, wherein user information pertaining to a use of electromagnetic radiation is maintained.

8. The system according to claim 1, further comprising a user interface for allowing a user to control said power unit remotely.

9. The system of claim 8, wherein said user interface allows a user to purchase a processing credit, said power unit being configured for generating said electromagnetic radiation according to said processing credit.

10. The system of claim 1, further comprising a controller configured for controlling said power unit, said controller being configured for managing said electromagnetic radiation generation according to a plurality of usage credit accounts of a plurality of users.

11. The system of claim 1, wherein at least one of said plurality of electromagnetic radiation conducting elements comprises a coaxial cable.

12. The system of claim 1, wherein said first housing is configured to be detachably connected to at least one of said plurality of second housings.

13. The system of claim 1, wherein said first housing and said plurality of second housings are configured without a common casing.

14. The system of claim 1, wherein said first housing and said plurality of second housings are separated by at least one meter.

15. The system of claim 1, wherein each resonant cavity is associated with a different user interface.

16. A facility configured for allowing heating of a plurality of objects in at least one room in at least one building, comprising:
    a power unit configured to be positioned outside a room of said at least one building and configured for generating electromagnetic radiation;
    a plurality of heating units located in at least one room, each heating unit having a resonant cavity for positioning at least one object; and
    a plurality of electromagnetic radiation conducting elements each configured to conduct, simultaneously with others of said plurality of electromagnetic radiation conducting elements, a portion of said electromagnetic radiation generated by said power unit to respective resonant cavities of said plurality of heating units for heating said plurality of objects.

17. The facility of claim 16, wherein said power unit is configured to be placed in a space selected from a group consisting of a roof, a basement, a cellar, a warehouse, a service area, and a depot, and said room is selected from a group consisting of a living room, a kitchen, and a laundry room.

18. The facility of claim 16, wherein said plurality of heating units are configured to be placed in a service providing venue.

19. The facility of claim 16, further comprising a controller configured for controlling said power unit according to a plurality of inputs each from a different of a plurality of user interfaces associated with said plurality of heating units.

20. The facility of claim 19, wherein said controller is configured for managing a plurality of credit accounts according to said plurality of inputs.

21. The facility of claim 16, wherein said plurality of heating units are each located in a different room from among a plurality of rooms.

22. The facility of claim 16, wherein said conducting comprises conducting said electromagnetic radiation along a distance of at least 5 meters.

23. The facility of claim 16, wherein each resonant cavity is associated with a different user interface.

24. A system for processing a plurality of objects, comprising:
- a first housing comprising a power unit configured for generating microwave radiation;
- a plurality of processing units, each having a resonant cavity for positioning at least one of said plurality of objects; and
- a plurality of microwave radiation conducting elements each configured to conduct, simultaneously with others of said plurality of microwave radiation conducting elements, a portion of said microwave radiation generated by said power unit to respective resonant cavities of said plurality of processing units for processing said plurality of objects;
- wherein said first housing and said plurality of processing units are physically separate from one another.

25. The system of claim 24, wherein said first housing and said plurality of processing units are separated by at least one meter.

26. The system of claim 24, wherein each resonant cavity is associated with a different user interface.

\* \* \* \* \*